United States Patent
Koppal et al.

(10) Patent No.: US 12,553,179 B2
(45) Date of Patent: Feb. 17, 2026

(54) APPARATUSES AND METHODS FOR SEAWEED EMBEDDED INTERTWINED ROPE MATRIX

(71) Applicant: SEA6 ENERGY PVT. LTD., Bangalore (IN)

(72) Inventors: Siddarth Koppal, Bangalore (IN); Jiju Thomas, Kerala (IN); Nelson Vadassery, Bangalore (IN)

(73) Assignee: SEA6 ENERGY PVT. LTD., Bangalore (IN)

( * ) Notice: Subject to any disclaimer, the term of this patent is extended or adjusted under 35 U.S.C. 154(b) by 0 days.

(21) Appl. No.: 18/716,905

(22) PCT Filed: Jan. 13, 2023

(86) PCT No.: PCT/IN2023/050038
§ 371 (c)(1),
(2) Date: Jun. 5, 2024

(87) PCT Pub. No.: WO2023/135612
PCT Pub. Date: Jul. 20, 2023

(65) Prior Publication Data
US 2025/0034803 A1    Jan. 30, 2025

(30) Foreign Application Priority Data
Jan. 14, 2022 (IN) .............. 202241002334

(51) Int. Cl.
*D07B 1/14* (2006.01)
*A01G 33/00* (2006.01)
*D07B 7/02* (2006.01)

(52) U.S. Cl.
CPC .............. *D07B 1/14* (2013.01); *A01G 33/00* (2013.01); *D07B 7/02* (2013.01);
(Continued)

(58) Field of Classification Search
CPC . A01G 33/00; D07B 1/14; D07B 7/02; D07B 2201/1096; D07B 2205/103; D07B 2501/2038
(Continued)

(56) References Cited

U.S. PATENT DOCUMENTS 2,601,620 A     6/1952  Marshall
10,687,483 B1 *  6/2020  Pothen ............... A01G 20/10
(Continued)

FOREIGN PATENT DOCUMENTS

CN    112205289 A    1/2021
GB     2101862 A     1/1983
(Continued)

OTHER PUBLICATIONS

International Search Report dated May 9, 2023 for corresponding International Application No. PCT/IN2023/050038. (5 pages).

*Primary Examiner* — Brady W Frazier
(74) *Attorney, Agent, or Firm* — Seed Intellectual Property Law Group LLP

(57) ABSTRACT

An apparatus for forming a rope matrix having seaweed propagules embedded therein is provided and may include an intertwining assembly configured to intertwine at least three ropes at a braiding point to form a rope matrix. Further, the apparatus may include a conveying device configured to introduce seaweed propagules adjacent to the braiding point and to enable embedding of the seaweed propagules within the rope matrix while the rope matrix is being formed. Further, the apparatus may comprises an offtake assembly configured to move the rope matrix, with the seaweed propagules embedded therein, out of the apparatus.

23 Claims, 15 Drawing Sheets

(52) U.S. Cl.
CPC ............... *D07B 2201/1096* (2013.01); *D07B 2205/103* (2013.01); *D07B 2501/2038* (2013.01)

(58) Field of Classification Search
USPC ........................................................... 47/64
See application file for complete search history.

(56) References Cited

U.S. PATENT DOCUMENTS

| | | | |
|---|---|---|---|
| 11,134,621 B1* | 10/2021 | Pothen | A01G 20/20 |
| 11,690,329 B1* | 7/2023 | Pothen | D03D 15/217 |
| | | | 47/31 |
| 11,877,549 B2* | 1/2024 | Knoll | A01C 1/044 |
| 2016/0219811 A1* | 8/2016 | Kati | A01G 33/00 |

FOREIGN PATENT DOCUMENTS

| | | |
|---|---|---|
| JP | H09275833 A | 10/1997 |
| JP | 2016007173 A | 1/2016 |

* cited by examiner

APPARATUSES AND METHODS FOR SEAWEED EMBEDDED INTERTWINED ROPE MATRIX

BACKGROUND

Description of the Related Art

Generally, seaweeds are cultivated through vegetative propagation. For cultivating seaweeds, initial planting materials, such as seaweed propagules, are attached to a substrate, such as lines of ropes, tubular net, or a regular net. Then, the substrate, having seaweed propagules attached thereon, is laid out in the sea using appropriate moorings to allow the seaweed propagules to fully grow into seaweeds.

In general, attaching initial planting materials for seaweed in vegetatively propagated seaweed farming systems is difficult. Conventionally, the initial planting materials, such as seaweed propagules, are manually tied to lines or ropes with small pieces of twine. This "seeded" line or rope is then laid out in the sea using appropriate moorings to allow these planting materials, for example the seaweed propagules, to grow. Depending on the type of seaweed, the initially planted material can grow to multiple times its size and is usually harvested after 6 weeks.

Harvesting is involves collecting these lines or ropes with fully grown seaweeds, separating the seaweeds from these lines, and using a small part of the harvest to re-seed new lines. The remainder is harvested and sold to be used in various applications. The disadvantage of this conventional system is that the tying of the seaweed propagules onto the lines is a laborious process and takes significant time.

This kind of farming, which involves using vegetative propagation of plantlets or propagules to grow the whole plant instead of using a "seed" or a spore to generate a whole plant, is reported to be used for a variety of seaweeds, such as those belonging to the genera Kappaphycus, Eucheuma, Halymenia, Gracilaria, Sargassum, Ulva, Gelidium, and Gelidiella. In vegetative propagation, the seaweed propagule is attached to a substrate like a rope, a tubular net, or a regular net by means of a physical attachment like a knot in the case of ropes. In an example, the seaweed propagule may be a physical piece of seaweed tissue.

Tying the seaweed propagules onto the lines or ropes is the most time-consuming process of the entire farming process, and as such contributes to the highest proportion of cost for growing these seaweeds. It is a repetitive and tedious process which is mostly done on land because of the large amount of manpower needed. This means that the seaweed propagules must be brought to shore, healthy vegetative seaweed propagules must be chosen and then tied to the substrate lines before these lines are laid out in the sea. This process requires several hours of work, and during this period the seaweed biomass or the seaweed propagule is kept outside water which can cause physiological stress in the plant resulting in lower growth.

Some conventional systems attempt to automate the process of inserting seaweed propagules into ropes. In such conventional systems, a piece of rope is twisted using mechanical grippers to increase the spacing between rope yarns, and a seaweed propagule may be manually inserted inside said twisted rope. This conventional system is quite complex and has the added limitation that the space obtained between the rope yarns is quite small, limiting the size of the seaweed propagules which can be inserted inside. Once the rope yarns are separated, the entire piece of seaweed propagule must be passed through the hole, much like threading the eye of a needle. Also, there are several sequential steps to attach each piece of seaweed propagule, which makes the system complex. Furthermore, the separation of rope yarns can potentially stress and damage the rope, which increases the more apart the rope yarns are spaced to insert the seaweed propagules.

BRIEF SUMMARY

The present disclosure describes apparatuses and methods which enable in significantly reducing the effort and time required to insert seaweed propagules within a substrate, such as a rope matrix. The present disclosure describes below the apparatuses and methods to insert seaweed propagules to the rope matrix which is to be farmed in the sea and/or in tanks, together with a device configured to harvest the seaweeds. Although it is described that the rope matrix is to be planted in the sea, the same setup can also be used to plant these seaweed propagules in tanks and inland reservoirs and/or water bodies.

The present disclosure proposes apparatuses for forming a rope matrix having seaweed propagules embedded therein such that the seaweed propagules remain in place when planted in the sea. In an embodiment, an apparatus comprises an intertwining assembly. The intertwining assembly is configured to intertwine at least three ropes at a braiding point to form a rope matrix. The braiding point is a point where the ropes pass alternatively over and under each other forming the rope matrix. The intertwining assembly has been explained in detail with reference to FIG. 1 through FIG. 12. The apparatus further comprises a conveying device or means. The conveying device or means is configured to introduce seaweed propagules adjacent to the braiding point and enables embedding of the seaweed propagules within the rope matrix while the rope matrix is being formed. The conveying device or means is explained in detail with reference to FIG. 13 through FIG. 18. The apparatus further comprises an offtake assembly. The offtake assembly is configured to move the rope matrix, with the seaweed propagules embedded therein, out of the apparatus.

The present disclosure further proposes methods for forming a rope matrix having seaweed propagules embedded therein such that the seaweed propagules remain in place when planted in the sea. In an embodiment, according to a proposed method, at least three ropes are intertwined, by an intertwining assembly of an apparatus, at a braiding point to form a rope matrix. The braiding point is a point where the ropes pass alternatively over and under each other forming the rope matrix. Further, seaweed propagules are introduced adjacent to the braiding point to embed the seaweed propagules within the rope matrix while the rope matrix is being formed. Further, according to the proposed method, the rope matrix, with the seaweed propagules embedded therein, is moved, by an offtake assembly of the apparatus, out of the apparatus.

The apparatuses and methods of the present disclosure are superior to the conventional systems as the proposed apparatuses and methods can potentially embed seaweed propagules of any size within the rope matrix and does not need the seaweed propagule to be threaded inside a space between the rope yarns of the rope. The technique of intertwining by the apparatus of the present disclosure imposes minimal stress on the yarns, even if the seaweed propagule inserted is large and hence increases usability. The apparatuses and methods also adapt to the seaweed propagule inserted, with the ropes or yarns (in an example, a rope can be a rope yarn) accommodating the additional space required by the seaweed propagule while it gets embedded within the rope matrix. The damage and the physical stress on the seaweed propagule is much lesser in the rope matrix, with seaweed embedded therein, made with the apparatuses and methods of the present disclosure as compared to conventional insertion of the seaweed propagule into a twisted rope-especially after the rope matrix is put into the water. All these advantages are ensured while the seaweed propagule is attached to the rope matrix or the substrate in a continuous mechanized manner, as opposed to an intermittent manner, thereby allowing for an attachment of seaweed propagules to happen at a much faster pace.

BRIEF DESCRIPTION OF THE SEVERAL VIEWS OF THE DRAWINGS

The features, aspects, and advantages of the subject matter will be better understood with regard to the following description, and accompanying figures. The use of the same reference number in different figures indicates similar or identical features and components.

DETAILED DESCRIPTION

The description hereinafter describes the apparatuses and methods, as per the present disclosure. The manner in which the apparatuses and the methods, for forming a rope matrix having seaweed propagules embedded therein, shall be implemented is explained in detail with respect to FIG. 1 through FIG. 19.

It should be noted that the description and figures merely illustrate the principles of the present disclosure. It will thus be appreciated that those skilled in the art will be able to devise various arrangements that, although not explicitly described herein, embody the principles of the present subject matter and are included within its scope. Furthermore, all examples recited herein are intended only to aid the reader in understanding the principles of the present disclosure. Moreover, all statements herein reciting principles, aspects and implementations of the present disclosure, as well as specific examples thereof, are intended to encompass equivalents thereof.

An example apparatus for intertwining involves intertwining at least three ropes by moving the ropes similar to the shape of an "8". The apparatus is described below.

Figure 1:
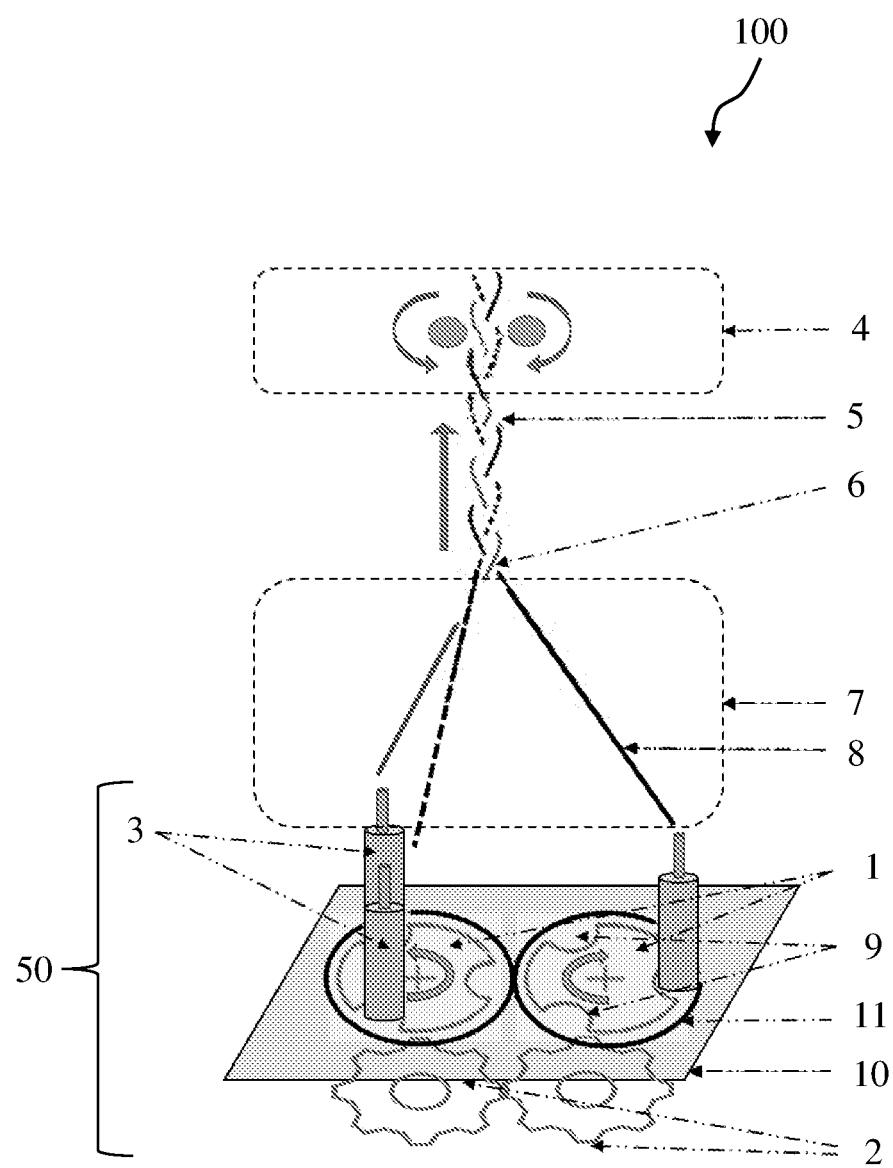
FIG. 1 illustrates an example apparatus for intertwining ropes, in accordance with an implementation of the present subject matter.

FIG. 1 shows an example apparatus 100 that includes an intertwining assembly 50. The intertwining assembly 50 is configured to intertwine at least three ropes 8 at a braiding point 6 to form a rope matrix 5. The braiding point 6 is a point where the ropes 8 pass alternatively over and under each other forming the rope matrix 5. The intertwining assembly 50 includes a set of at least three carriers 3. At least three of the carriers 3 carry a respective spool of rope. Further, each carrier 3 may include a dispensing device or means for dispensing the rope 8 at a pre-determined tension. To form the rope matrix 5, the carriers 3, carrying the spools, are configured to move about each other in a particular orientation or a serpentine path 11 to allow the ropes 8 to pass alternatively over and under each other diagonally to the longitudinal axis of the rope matrix 5 at the braiding point 6. In other words, the carriers 3 move such that the three ropes 8 extending out of the carriers 3 intertwine amongst each other at the braiding point 6. At any section of the rope matrix 5 for n ropes, each rope passes over x ropes and passes under y ropes where x+y=n−1, where x, y, and n are natural numbers. For example, in the apparatus 100, n (the number of ropes 8)=3. Therefore, x+y=3−1=2. Thus, the only possibility is x=1 and y=1. Therefore, for apparatus 100, each rope 8 passes over a first rope 8 and passes under a second rope 8 to form the rope matrix 5. The formation of the rope matrix 5 is a continuous process.

The apparatus 100 further includes an offtake assembly 4. The offtake assembly is configured to move the resulting intertwined rope matrix 5 out of the apparatus 100. The offtake assembly 4 is configured to move the rope matrix 5 away from an intertwining zone 7. The intertwining zone 7 is a region from the point where the rope 8 leaves the carrier 3, until the braiding point 6 where the ropes 8 get intertwined into the rope matrix 5. The intertwining zone 7 introduces seaweed propagules and secures them within the rope matrix 5.

The offtake assembly 4 ensures that the rope matrix 5 is moved out of the apparatus 100 while in tension and in an even manner such that the entire intertwined rope matrix 5 is uniform throughout the length. The offtake assembly 4 may be a system of contrarotating rollers, contrarotating caterpillar tracks, a winding spool, a capstan, a winch, or a pulley, which is configured to move out the rope matrix 5 while maintaining tension ensuring that the ropes 8 always remains taut during the formation of the intertwined rope matrix 5. The speed of offtake and the tension determines a number of factors, including the strength and stiffness of the intertwined rope matrix 5. In some embodiments, as shown in FIG. 1, a pair of rollers are configured to apply pressure against each other with the intertwined rope matrix 5 therebetween pulling the intertwined rope matrix 5 away from the intertwining zone 7. This happens as the three carriers 3 are moving around in the serpentine path 11 such that their tracks approximately sketch the figure "8" (eight) at the bottom. The mechanism to ensure this involves the carrier 3 interacting with slot gears 1.

The intertwining assembly 50 includes a slot gear assembly coupled to the carriers 3. The slot gear assembly is configured to move the carriers 3 in the serpentine path 11. The slot gear assembly comprises at least two slot gears 1. The two slot gears 1, which are counter rotating to each other and each contain slots 9 along their circumference, are aligned in such a way that the slots 9 of two neighboring slot gears 1 always align while the slot gears 1 rotate. The slot gear assembly further includes a set of coaxial gears 2. The slot gears 1 are configured to be powered by the set of coaxial gears 2 below them, each of the coaxial gears 2 configured to mesh with the neighboring coaxial gear 2 of the slot gear assembly such that all adjacent coaxial gears 2 and their corresponding slot gears 1 rotate opposite to each other.

Any one of these coaxial gears 2 may be powered or energized via a motor, an engine, hand crank or any other conventional device or means of rotary motion such that the entire intertwining assembly 50 moves.

The apparatus 100 includes a track plate 10, on top of the slot gear assembly, with the serpentine path 11 cut through the track plate 10. All the carriers 3 are configured to move within the serpentine path 11. The carriers 3 have a projection (such as projection 21 illustrated in FIG. 2), on the side facing the slot gear assembly, which is configured to fit inside the slot 9 of the slot gear 1. As the slot gear 1 rotates, the carrier 3 is configured to move along with the slot 9, until it encounters the aligned slot 9 from the neighboring slot gear 1. At this point, the carrier 3 is configured to move into the adjacent available slot 9 and from a first slot gear 1 to a second slot gear 1, also changing the direction of rotation of the carrier 3. This switching of the carrier 3 from a first slot 9 to a second slot 9 is enabled by a track plate 10 and a special geometry in the carrier 3, as can be seen in FIG. 2.

Figure 2:
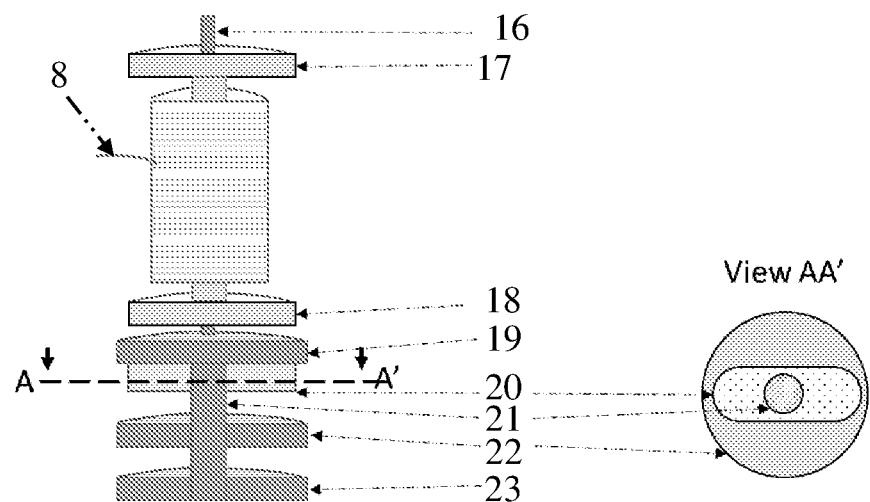
FIG. 2 illustrates a detailed view of a carrier of an apparatus, in accordance with an implementation of the present subject matter.

FIG. 2 shows a detailed view of the carrier 3. The carrier 3 includes a projection 21 and an elongated base 20 (also interchangeably referred to as a "guide 20" hereinafter). The projection 21 below a carrier base 19 is configured to fit into the slot 9 of the slot gear 1. The carrier 3 may include plates 22 and 23. The plates 22 and 23 sit on either side of the slot gear 1 to provide stability to the carrier 3. The portion of the projection 21 which lies between plates 22 and 23 is engaged by the slot 9 of the slot gear 1. The carrier 3 is configured to rotate with the slot gear 1 until it comes to the point where the slot 9 of one slot gear 1 aligns with the slot 9 of the adjacent slot gear 1.

The elongated base 20 or the guide 20, is configured to move within the serpentine path 11 and the intertwining assembly 50 is configured such that the curvature of the serpentine path 11 is sufficient for the elongated base 20 to move both in a straight line and across the wide curve of the serpentine path 11 around the slot gears 1. However, the guide 20 is configured to prevent the carrier 3 from making a turn with a small radius of curvature. The guide 20 is configured to allow the carrier 3 to move from the slot 9 of a first slot gear 1 to a second slot 9 in the adjacent slot gear 1. This is because at the intersection point in the serpentine path 11, a carrier 3 has three options-to move straight ahead, to move right, or to move left. The small turning radius needed for the left and right turns effectively prevents the guide 20 in the carrier 3 from doing so and forces the guide 20 to move diagonally opposite into the serpentine path 11 surrounding the adjacent slot gear.

The carrier 3 includes a pin 16 to carry a spool of rope. The spool of rope has an upper plate 17 and a lower plate 18 between which the rope 8 is wound.

Figure 3:
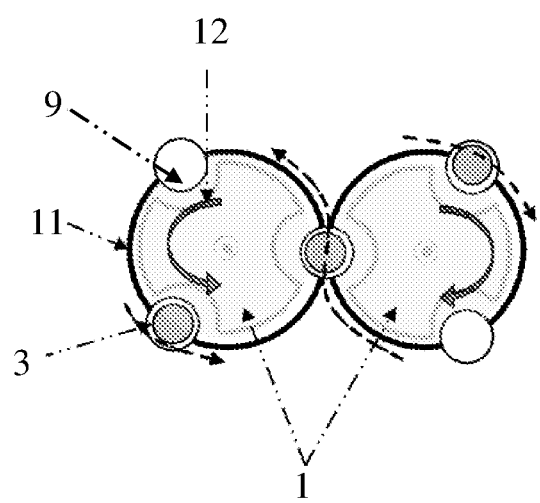
FIG. 3 illustrates movement of the carriers in the example apparatus of FIG. 1.

FIG. 3 shows the movement of the carriers 3 in two slot gear 1 with three carrier based intertwining assembly 50. For example, in FIG. 3, as the slot gears 1 rotate in a rotational direction 12, the first carrier 3 coming from the right slot gear I will move diagonally to the left slot gear 1, while the next carrier 3 coming from the left slot gear 1, will move diagonally to the right slot gear 1.

Apart from enabling the spools of rope to be intertwined in a specific manner, the carriers 3 also serve other important functions as mentioned below. The carrier 3 is designed to handle the following functions:
1. Carry a spool filled with the rope 8.
2. Provide the rope 8 into the intertwining zone 7 such that the rope 8 is taut, preferably at a pre-determined constant tension.
3. Provide the rope 8 with minimum jerks or peaks in tension.

There may be several ways of providing this functionality. The spool on the carrier 3 may be held horizontally or vertically, while the pre-determined tension can be provided either using a spring, friction, or using a weight. Some embodiments are described later in this disclosure.

In the two-slot gear apparatus 100, each slot gear I can have multiple slots 9, from 3 slots to 6 slots, provided the slots 9 of adjacent slot gears 1 align with each other upon rotation. The number of carriers 3 may also increase depending on the number of slots 9 provided to obtain intertwined rope matrices 5 of different configurations.

A similar mechanism of intertwining can be extended to apparatuses with n number of slot gears 1, where n>1. In some embodiments, the slot gears I may be arranged linearly in a line or a curve, where the number of slot-gears is n, where n>1. In some embodiments, the slot-gears may be arranged in a circular shape, where the number of slot-gears is 2n, where n>1.

In these apparatuses, when there are even number of slot gears 1 arranged in a circle, two sets of carriers move around them. In this case, a first set of carriers is configured to move clockwise, and a second set of carriers is configured to move counter-clockwise to form the intertwined rope matrix 5.

Figure 4:
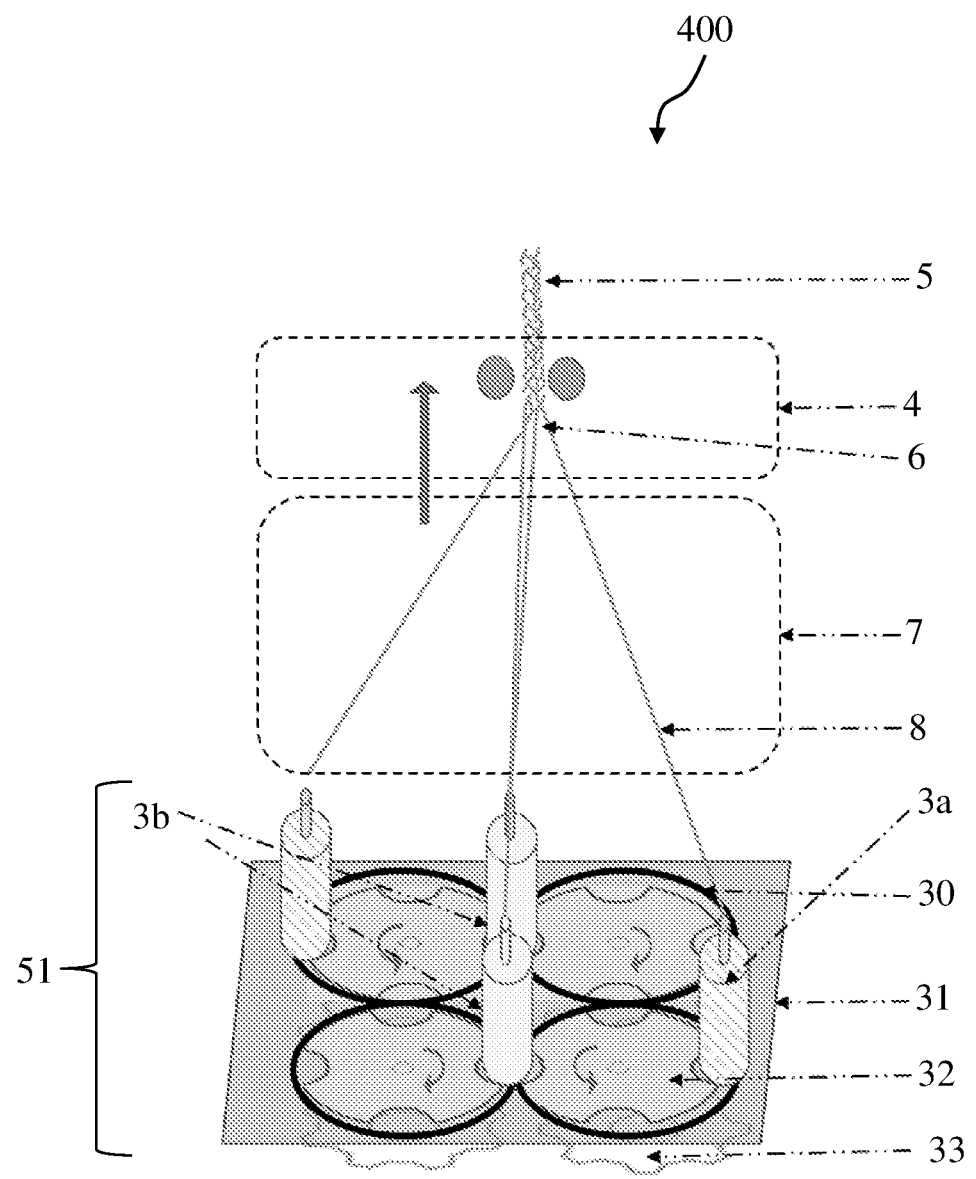
FIG. 4 illustrates an example apparatus for intertwining ropes, in accordance with an implementation of the present subject matter.

FIG. 4 illustrates an apparatus 400 having an intertwining assembly 51. The intertwining assembly 51 is configured to intertwine ropes 8 at the braiding point 6 to form a rope matrix 5. The intertwining assembly 51 includes four carriers 3a, 3b and a slot gear assembly with a four slot gear setup. In FIG. 4, the carriers 3b are configured to move clockwise, and the carriers 3a are configured to move in the other direction about the central point around which all the slot gear axes are circumscribed. Both sets of carriers 3a, 3b are configured to alternate between the insides and outsides of the slot gears 32, such that their paths only intersect at the point the slots of adjacent slot gears 32 are closest to each other. This motion is assisted by a track plate 31 inside which a serpentine path 30 is cut through. This serpentine path 30 enables the guide 20 of the carrier 3 to move from a first slot gear 32 to a second slot gear 32 in a serpentine manner such that the paths of carriers 3a, 3b only intersect but do not share a common arc. The slot gears 32 are mounted on a common shaft with coaxial gears 33.

Figure 5:
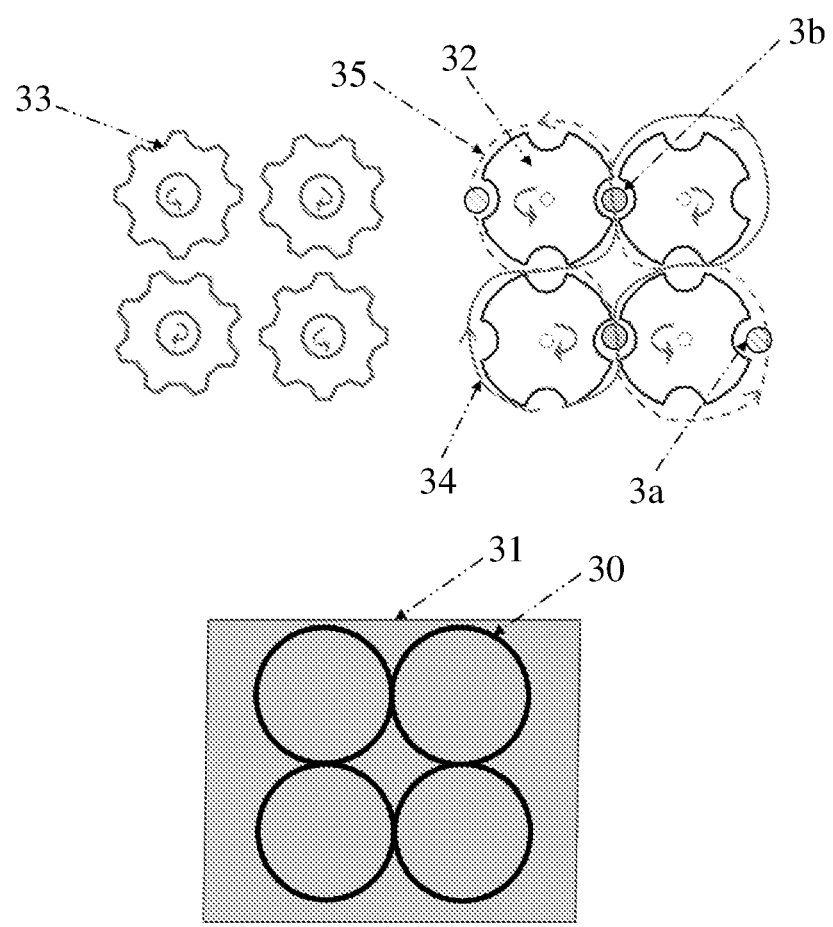
FIG. 5 illustrates a track plate and movement of the carriers within the track plate in the example apparatus of FIG. 4.

As can be seen in FIG. 5, carriers 3a are configured to follow path 35 and carriers 3b are configured to follow path 34 such that the carriers 3a, 3b only intersect at the point where the slots of the slot gears 32 face each other. This ensures that when a carrier 3a is moving inward, another carrier 3b moving in the opposite direction (and vice versa) moves outwards, thereby intertwining the rope 8 and repeating this process repeatedly to form a repeatable intertwined rope matrix 5.

Each coaxial gear 33 is configured to mesh with an adjacent coaxial gear 33 such that each set of slot gears 32 and the associated coaxial gears 33 has an alternating rotation direction compared to the coaxial gear 33 and slot gear 32 adjacent to it. This mechanism is configured to be powered by providing rotary motion to any one of the coaxial gears 33 such that the entire intertwining assembly 51 moves and the carriers 3a and 3b follow the paths 35 and 34, respectively.

The intertwined rope matrix 5 is configured to be moved out of the apparatus 400 by the offtake assembly in a same manner as explained for apparatus 100. The speed at which the offtake happens determines the tightness of the intertwined rope matrix. The point where the ropes 8 intertwine is the braiding point 6. The region from the braiding point 6 until the point where the ropes 8 leave the carriers 3a, 3b is the intertwining zone 7. Seaweed propagules which embed within the rope matrix 5 are introduced in the intertwining zone 7.

It should be understood that in such an apparatus, the number of slots in each slot gear can be greater than 2, as long as all the slot gears have the same slots and the slots of adjacent slot gears align with each other upon rotation. The number of carriers also may vary depending on the kind of intertwining desired. For example, the apparatus may have a six-slot slot gear with as few as three carriers to as many as twelve. In some embodiments, there may be as many carriers as half the number of slots. The apparatus as described above may be include four slot gears with two slots each as four carriers are used. The apparatus described herein may support between three carriers and eight carriers. As the number of carriers increases, the apparatus must be sufficiently large to accommodate the increased number of carriers.

Figure 6:
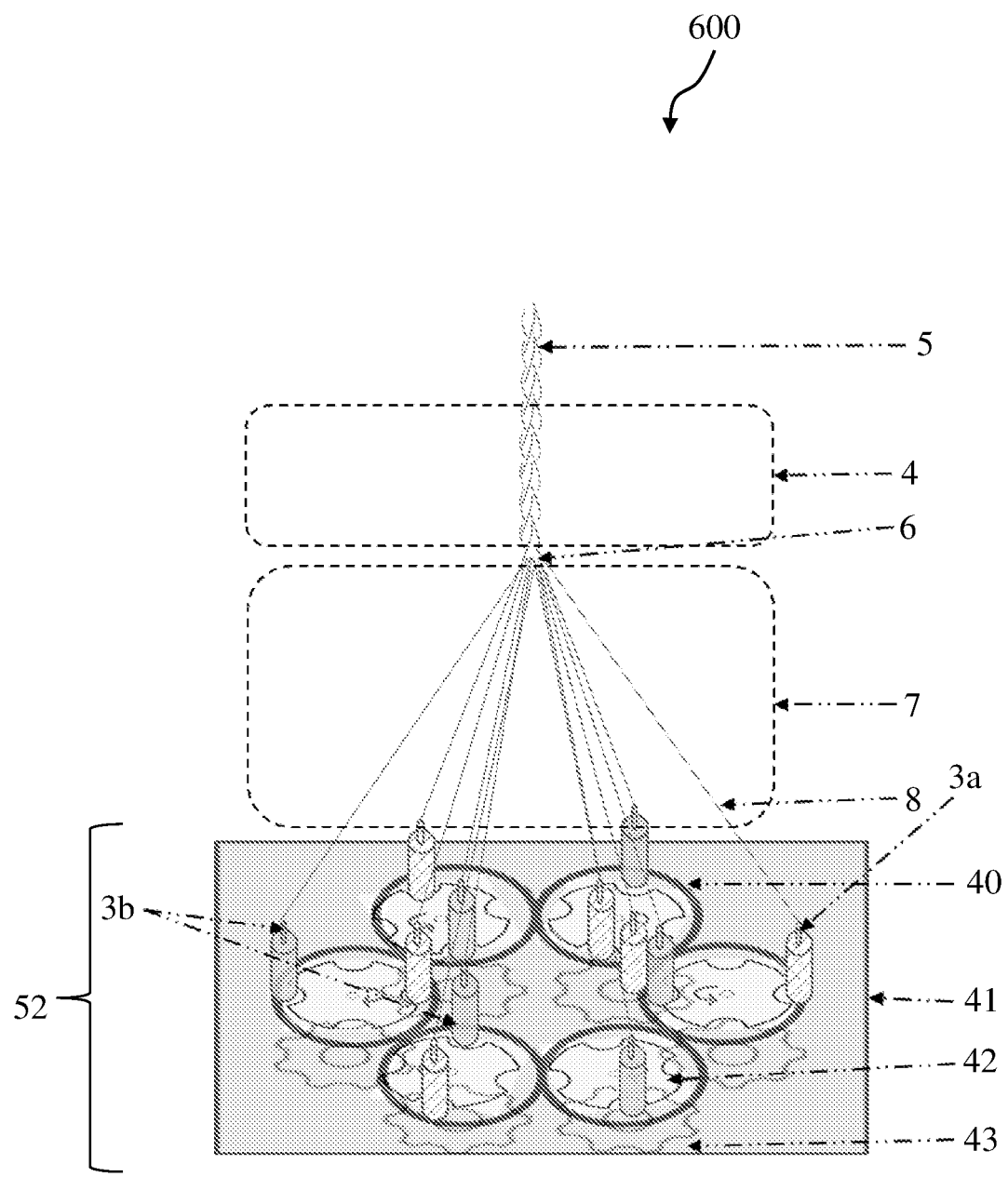
FIG. 6 illustrates an example apparatus for intertwining ropes, in accordance with an implementation of the present subject matter.

FIG. 6 shows an apparatus 600 having an intertwining assembly 52. The intertwining assembly 52 is configured to intertwine ropes 8 at the braiding point 6 to form a rope matrix 5. The intertwining assembly 52 includes twelve carriers 3a, 3b and a slot gear assembly with six slot gears. In FIG. 6, the carriers 3b are configured to move clockwise and the carriers 3a are configured to move in the other direction about the central point around which all the slot gear axes are circumscribed. Both sets of carriers 3a, 3b are configured to alternate between in the insides and outsides of the slot gears 42, such that their paths only intersect at the point the slots of adjacent slot gears 42 are closest to each other. This motion is assisted by a track plate 41 inside which a serpentine path 40 is cut through. This serpentine path 40 is configured to enable the guide 20 of the carrier 3 to move from one slot gear 42 to another in a serpentine manner such that the paths of carriers 3a, 3b only intersect but do not share a common arc. The slot gears 32 are mounted on a common shaft with coaxial gears 43.

Figure 7:
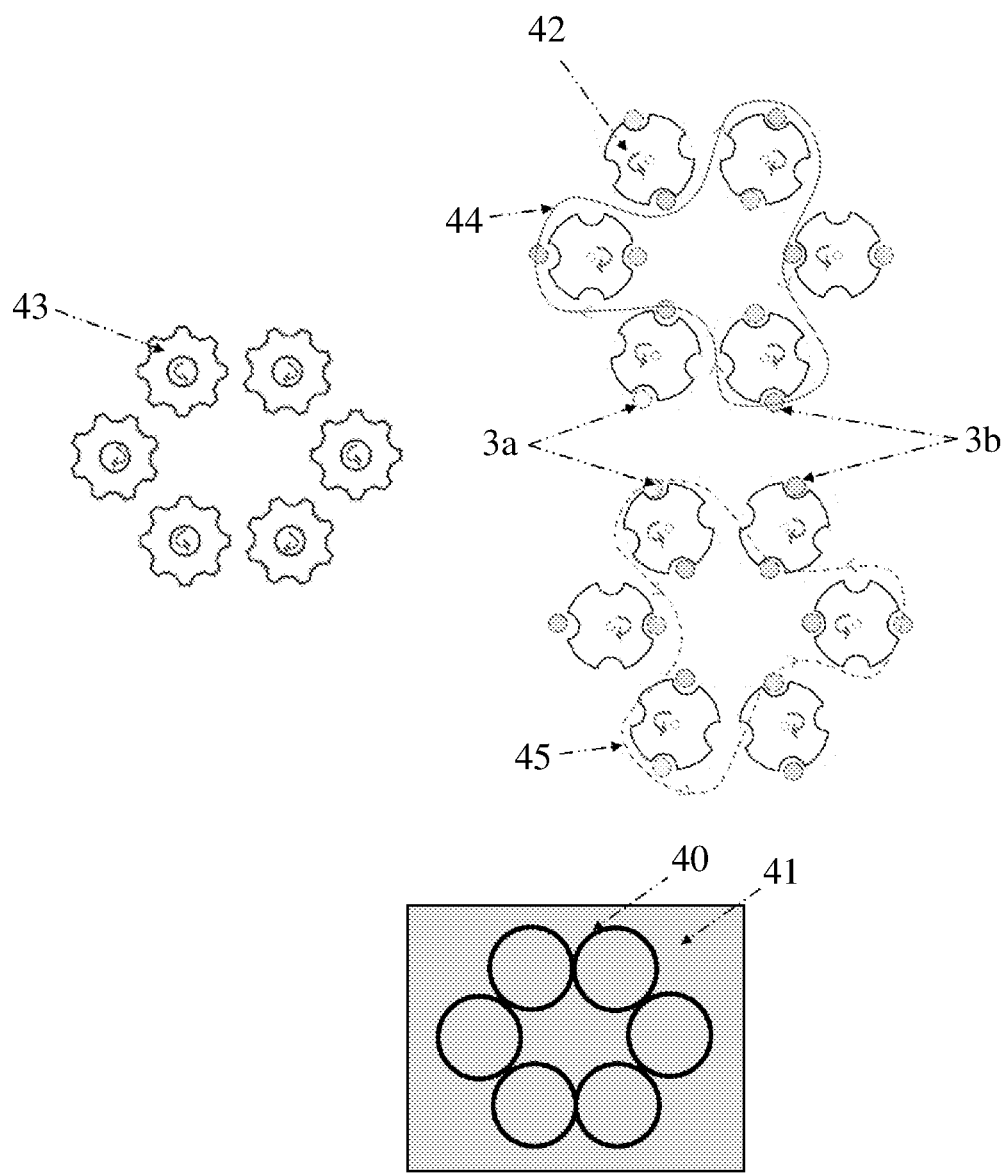
FIG. 7 illustrates a track plate and movement of the carriers within the track plate in the example apparatus of FIG. 6.

As can be seen in FIG. 7, carriers 3a are configured to follow path 45 and carriers 3b are configured to follow path 44 such that the carriers 3a, 3b only intersect at the point where the slots of the slot gears face each other. This ensures that when a carrier 3a is moving inward, another carrier 3b moving in the opposite direction (and vice versa) moves outwards, thereby intertwining the rope 8 and repeating this process repeatedly to form a repeatable intertwined rope matrix 5.

Each coaxial gear 43 is configured to mesh with adjacent coaxial gear 43 such that each set of slot gears 42 and the associated coaxial gears 43 has an alternating rotation direction compared to the coaxial gear 43 and slot gear 42 adjacent to it. This mechanism is configured to be powered by providing rotary motion to any one of the coaxial gears 43 such that the entire intertwining assembly 52 moves and the carriers 3a, 3b follow the paths 45 and 44, respectively.

In FIG. 6, the intertwined rope matrix 5 is configured to be moved out of the apparatus 400 by the offtake system 4 in a similar manner as explained for apparatus 100. The speed at which the offtake occurs determines the tightness of the intertwined rope matrix. The point where the ropes 8 intertwine is the braiding point 6. The region from the braiding point 6 until the point where the ropes 8 leave the carriers 3a and 3b is the intertwining zone 7. Seaweed propagules which embed within the rope matrix 5 may be introduced in the intertwining zone 7.

It should be understood that in such an apparatus, the number of slots in each slot gear may be greater than three, as long as all the slot gears have the same slots and the slots of adjacent slot gears align with each other upon rotation. The number of carriers also may vary depending on the kind of intertwining desired. The arrangement of carriers within the slots may also vary depending on the kind of intertwining desired.

The mechanism of intertwining may be extended to apparatuses with odd numbered slot-gears.

Figure 8:
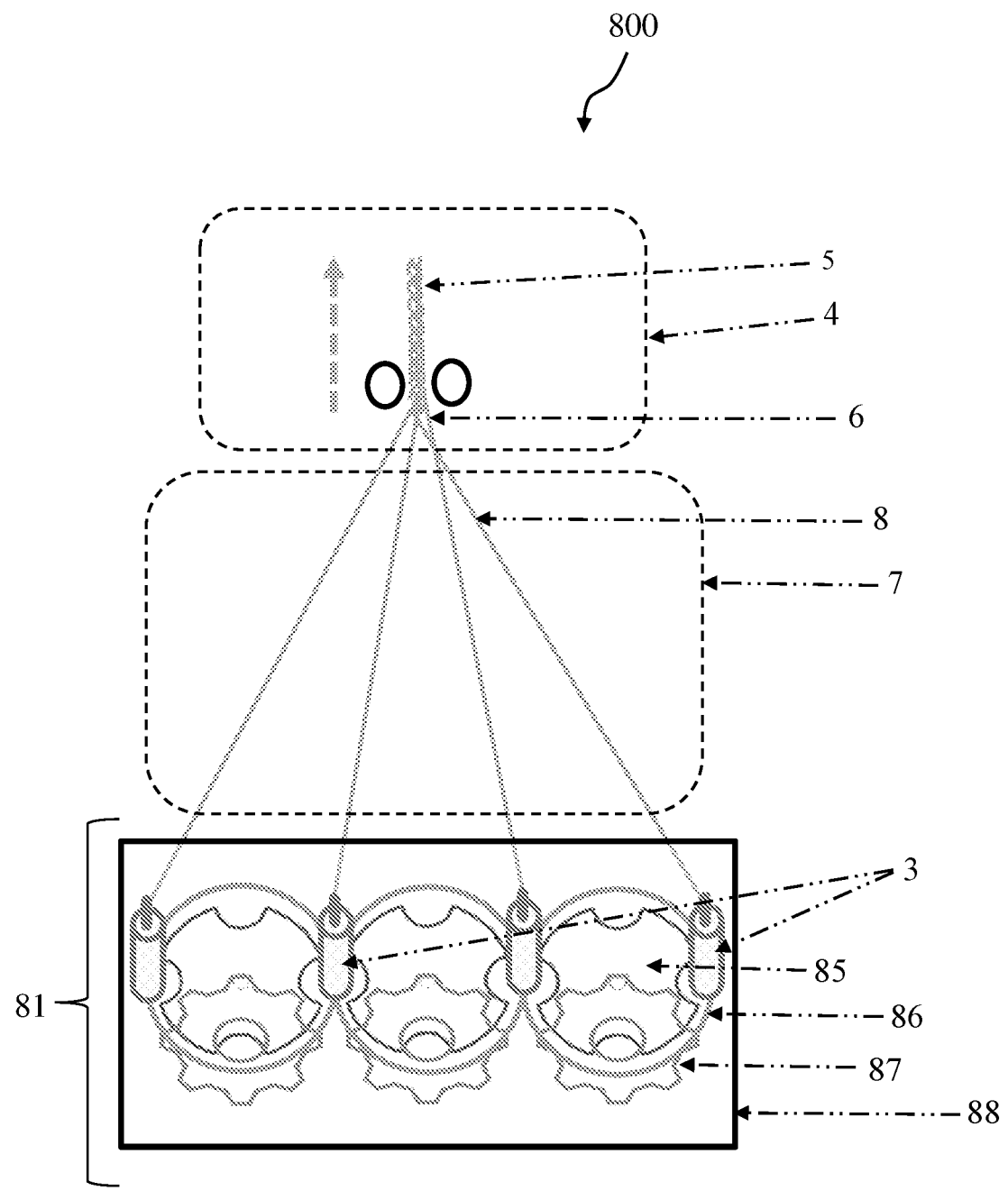
FIG. 8 illustrates an example apparatus for intertwining ropes, in accordance with an implementation of the present subject matter.

FIG. 8 illustrates an apparatus 800 having an intertwining assembly 81. The intertwining assembly 81 is configured to intertwine ropes 8 at the braiding point 6 to form an intertwined flat rope matrix 5. The intertwining assembly 81 includes four carriers 3 and a slot gear assembly with a three slot gear setup. In FIG. 8, the carriers 3 are arranged around a single intersecting serpentine path 86. The carriers 3 are configured to move in one direction for one half of the length of the serpentine path 86 and to reverse their direction when the carriers 3 reach the boundary of the serpentine path 86. The serpentine path 86 intersects itself twice at the point the slots of adjacent slot gears 85 align themselves and are closest to each other. This motion is assisted by a track plate 88 inside which the serpentine path 86 is cut through. This serpentine path 86 is configured to enable the guide 20 of the carrier 3 to move from one slot gear 85 to another in a serpentine manner. The slot gears 85 are mounted on a common shaft with coaxial gears 87.

Figure 9:
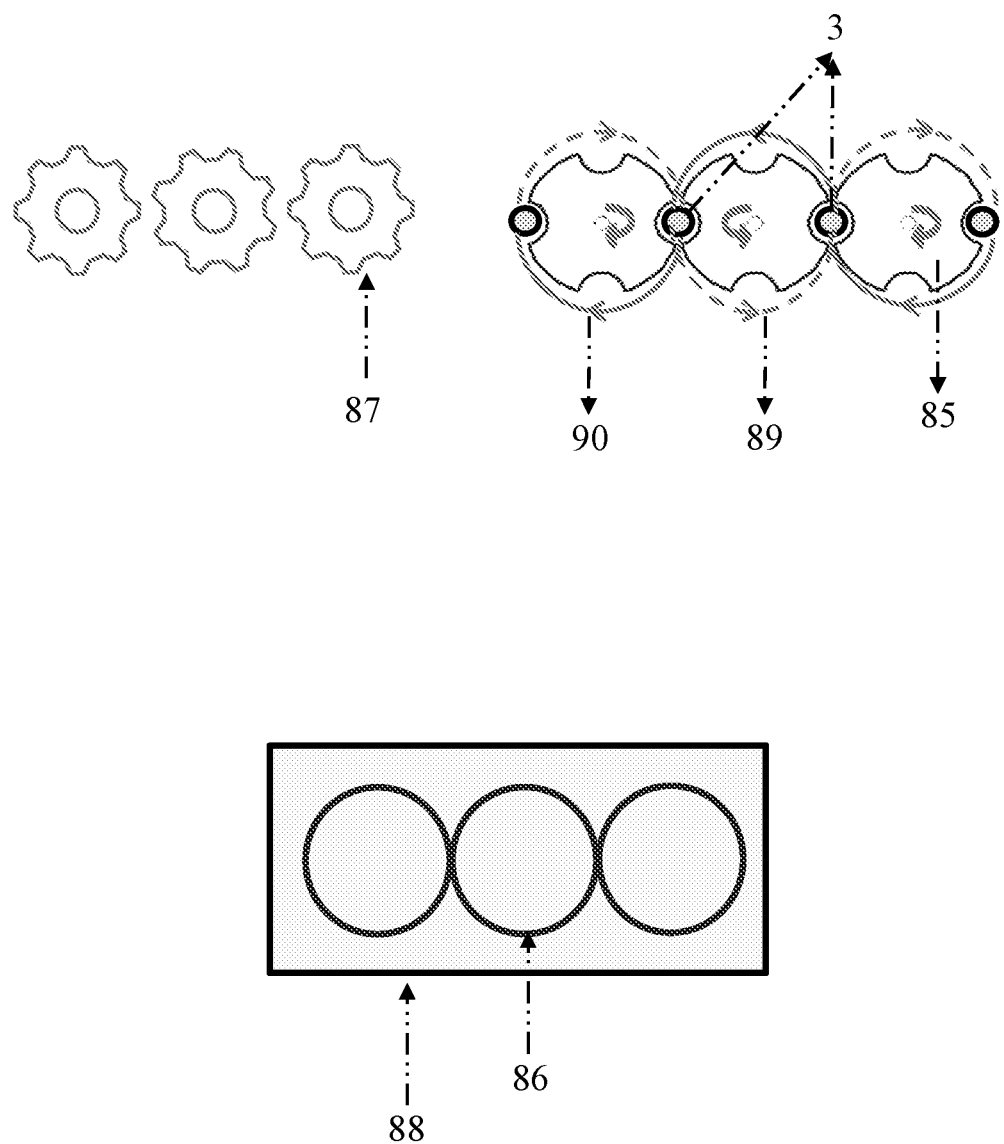
FIG. 9 illustrates a track plate and movement of the carriers within the track plate in the example apparatus of FIG. 8.

As can be seen in FIG. 9, carriers 3 are configured to follow path 89 along the dashed line for one half of their length and to reverse their direction to move along path 90 on the solid line when the carriers 3 reach the boundary of the serpentine path 86, thereby intertwining the rope 8 and repeating this process repeatedly to form a repeatable intertwined rope matrix 5.

Each coaxial gear 87 is configured to mesh with adjacent coaxial gear 87 in such that each set of slot gears 85 and the associated coaxial gears 87 has an alternating rotation direction compared to the coaxial gear 87 and slot gear 85 adjacent to it. This mechanism is configured to be powered by providing rotary motion to any one of the coaxial gears 87 such that the entire intertwining assembly 81 moves and the carriers 3 follow the combined path 89 and 90.

In FIG. 8, the intertwined rope matrix 5 is configured to be moved out of the apparatus 800 by the offtake system 4 in the same manner as explained for apparatus 100. The speed at which the offtake occurs determines the tightness of the intertwined rope matrix. The point where the ropes 8 intertwine is the braiding point 6. The region from the braiding point 6 until the point where the ropes 8 leave the carriers 3a and 3b is the intertwining zone 7. Seaweed propagules which embed within the rope matrix 5 may be introduced in the intertwining zone.

It should be understood that in such an apparatus, the number of slots in each slot gear may be two or more, as long as the slots of adjacent slot gears align with each other upon rotation. The number of carriers and the arrangement of carriers within the slots may also vary depending on the kind of intertwining desired.

The mechanism of making intertwined flat rope matrix may be extended to apparatuses with paths for carriers arranged in a curved path.

Figure 10:
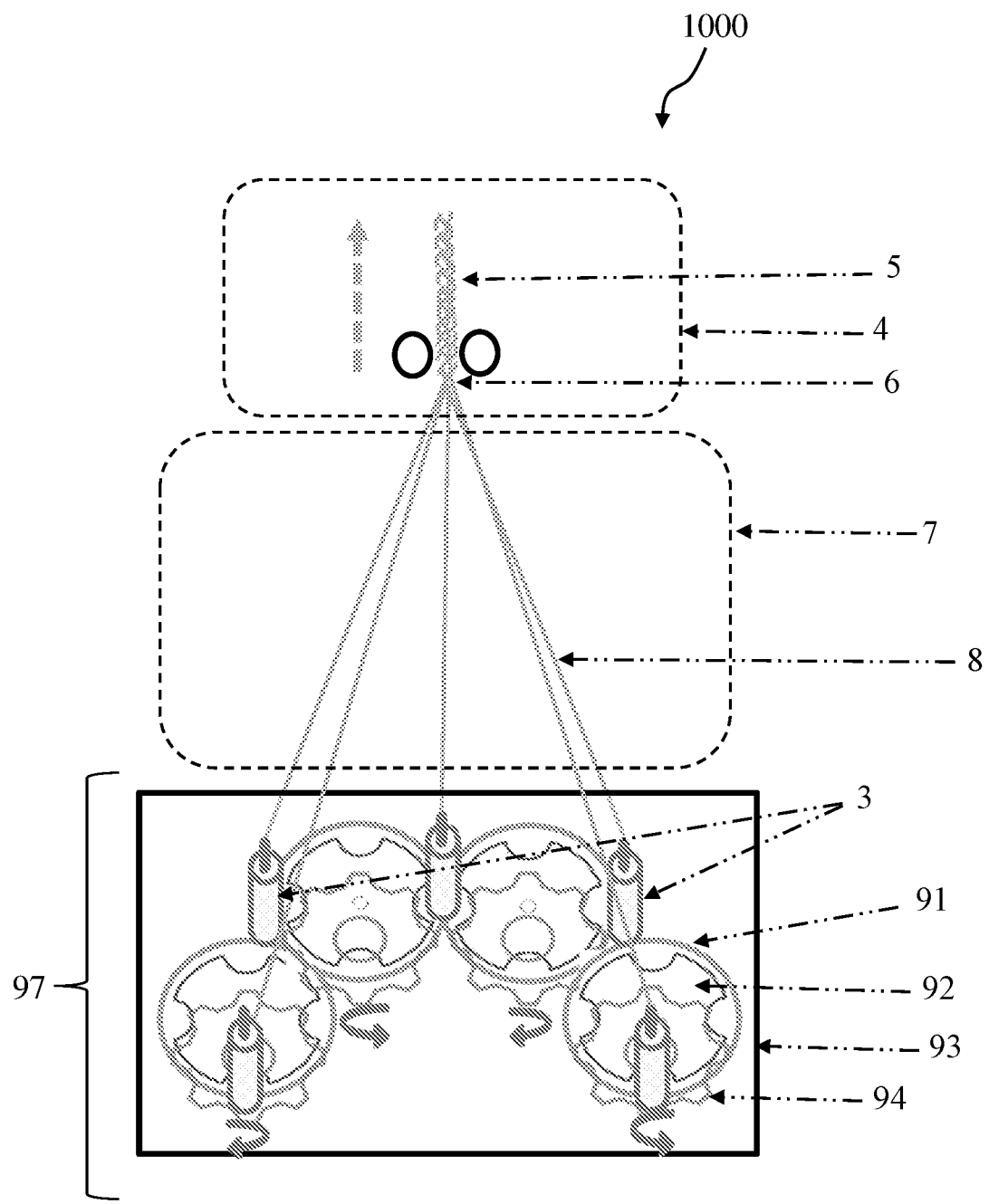
FIG. 10 illustrates an example apparatus for intertwining ropes, in accordance with an implementation of the present subject matter.

FIG. 10 illustrates an apparatus 1000 having an intertwining assembly 97. The intertwining assembly 97 is configured to intertwine ropes 8 at the braiding point 6 to form an intertwined flat rope matrix 5. The intertwining assembly 97 includes five carriers 3 and a slot gear assembly with a four-slot gear setup. In FIG. 10, the carriers 3 are arranged around a single, curved, intersecting serpentine path 91. The carriers 3 are configured to move in one direction for one half of the length of the serpentine path 91 and to reverse their direction when the carriers 3 reach the boundary of the serpentine path 91. The serpentine path 91 intersects itself twice at the point the slots of adjacent slot gears 92 align themselves and are closest to each other. This motion is assisted by a track plate 93 inside which the serpentine path 91 is cut through. This serpentine path 91 is configured to enable the guide 20 of the carrier 3 to move from one slot gear 92 to another in a serpentine manner. The slot gears 92 are mounted on a common shaft with coaxial gears 94.

Figure 11:
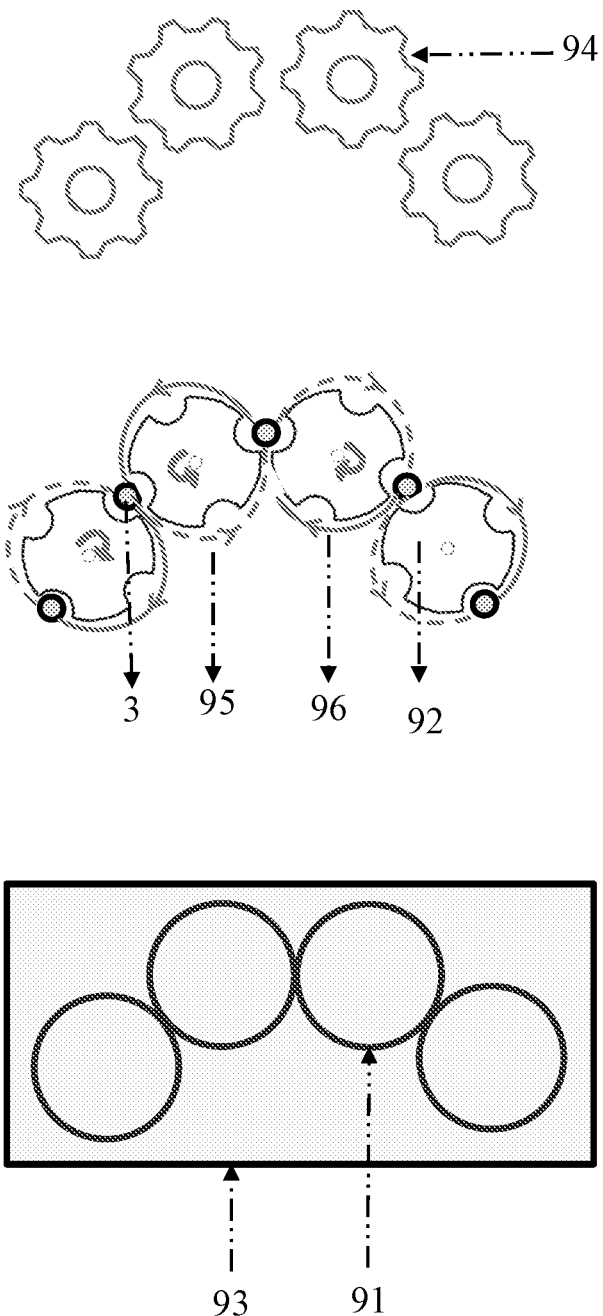
FIG. 11 illustrates a track plate and movement of the carriers within the track plate in the example apparatus of FIG. 10.

As can be seen in FIG. 11, the carriers 3 are configured to follow path 95 along the dashed line for one half of their length and to reverse their direction to move along path 96 on the solid line when the carriers 3 reach the boundary of the serpentine path 91, thereby intertwining the rope 8 and repeating this process repeatedly to form a repeatable intertwined rope matrix 5.

Each coaxial gear 94 is configured to mesh with adjacent coaxial gear 94 such that each set of slot gears 92 and their associated coaxial gears 94 has an alternating rotation direction compared to the coaxial gear 94 and slot gear 92 adjacent to it. This mechanism is is configured to be powered by providing rotary motion to any one of the coaxial gears 94 such that the entire intertwining assembly 97 starts moving and the carriers 3 follow the combined path 95 and 96.

In FIG. 10, the intertwined rope matrix 5 is configured to be moved out of the apparatus 1000 by the offtake system 4 in a same manner as explained for apparatus 100. The speed at which the offtake occurs determines the tightness of the intertwined rope matrix. The point where the ropes 8 intertwine is called the braiding point 6. The region from the braiding point 6 until the point where the ropes 8 leave the carriers 3 is called the intertwining zone 7. Seaweed propagules which embed within the rope matrix 5 may be introduced in the intertwining zone.

It should be understood that in such an apparatus, the number of slots in each slot gear may be two or more, so long as the slots of adjacent slot gears align with each other upon rotation. The number of carriers and the arrangement of carriers within the slots may also vary depending on the kind of intertwining desired.

In some example embodiments, where the slot gears in an apparatus are arranged linearly in a line or a curve, such as in the apparatuses illustrated in FIG. 8 through FIG. 10, all the slot gears may have the same number of slots and the size of all the slot gears may be the same. In further example embodiments, where the slot gears in an apparatus are arranged linearly in a line or a curve, such as in the apparatuses illustrated in FIG. 8 through FIG. 10, the number of slots in the slot gears and the size of the slot gears may be different with respect to each other. In further example embodiments, the circumferential distance between the slots, i.e., the distance between two slots on a slot gear as measured along the circumference of the slot gear, is substantially similar in all the slot gears so as to ensure that the slots of adjacent slot gears always align with each other upon rotation.

Figure 12:
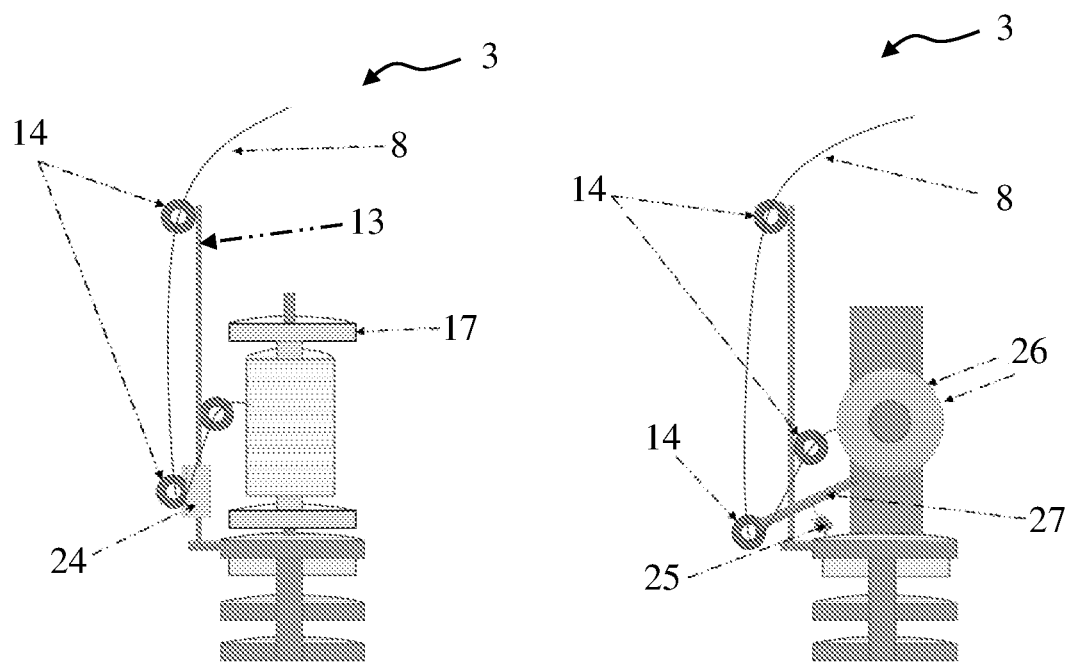
FIG. 12 illustrates types of carriers, in accordance with an implementation of the present subject matter.

FIG. 12 shows types of carriers 3. There can be a wide variety of carriers 3 providing the function of delivering ropes 8 to the braiding point 6 with a pre-determined tension. The mechanism on the left in FIG. 8 is configured to maintain tension in the rope 8 by a sliding weight 24 which is configured to move along a rod 13. The rope 8 is attached to the weight 24 by way of an eyelet/rope guide 14. The sliding weight 24 may also be held in place using a spring to be independent of gravity.

The mechanism on the right in FIG. 12 uses a lever 27 and a spring 25 to maintain tension on the rope 8. A rope spool 26 in this case may be mounted horizontally or vertically.

Embedding the Seaweed Propagules

The example apparatuses described herein may include a conveying device or means configured to introduce seaweed propagules adjacent to the braiding point 6 and to enable embedding of the seaweed propagules within the rope matrix 5 while the rope matrix 5 is being formed by the example apparatuses. The offtake assembly 4 is configured to then move the rope matrix 5, with the seaweed propagules embedded therein, out of the respective apparatus 100, 400, 600, 800, 1000. The conveying device or means may include, but is not limited to, a screw conveyor, a belt conveyor, a gravity fed chute, pistons, or a combination thereof, configured to feed seaweed propagules into the intertwining zone 7 and adjacent to the braiding point 6. Multiple conveying devices or means may be used simultaneously for introducing seaweed propagules adjacent to the braiding point 6 in some example embodiments. The example apparatuses described herein or the intertwining assembly itself may be placed horizontally, vertically or at an incline. The conveying device or means may be fed by a hopper or by yet another conveying system.

Figure 13:
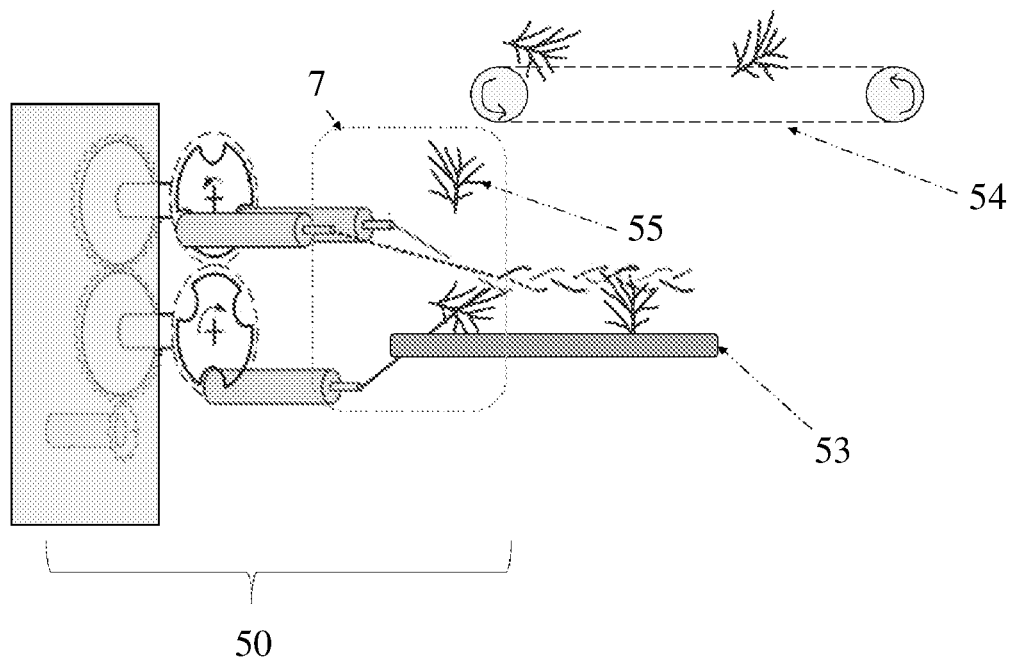
FIG. 13 illustrates an apparatus for intertwining ropes having a conveying device, in accordance with an implementation of the present subject matter.

FIG. 13 shows an apparatus having a two-slot gear assembly with a three carrier intertwining assembly 50 which is mounted horizontally. The apparatus includes a conveying device or means which includes a conveyor belt 54 configured to feed seaweed propagules 55 into the intertwining zone 7 and adjacent to the braiding point 6. The conveyor belt 54 is configured to move the seaweed propagules 55 such that each of the seaweed propagules 55 falls adjacent to the braiding point 6 into the intertwining zone 7 for embedding within the rope matrix 5 at the braiding point 6. The seaweed propagule 55 entering the conveyor belt 54 may be fed manually or through a hopper, or through another conveying system. In some embodiments, the conveying device or means may also include a support 53 positioned below the conveyor belt 54. The support 53 may be placed adjacent to the braiding point. The support 53 is configured to provide a specific residence time to the seaweed propagule 55 prior to embedding within the rope matrix 5. The specific residence time is a minimum time that is required by the seaweed propagule 55 to intertwine within the rope matrix 5 being moved from the intertwining assembly 50. The support 53 may be flat, curved, include a mesh, include brushes, or include taut strands of rope to increase the residence time of the seaweed propagules 55 in the intertwining zone 7.

Figure 14:
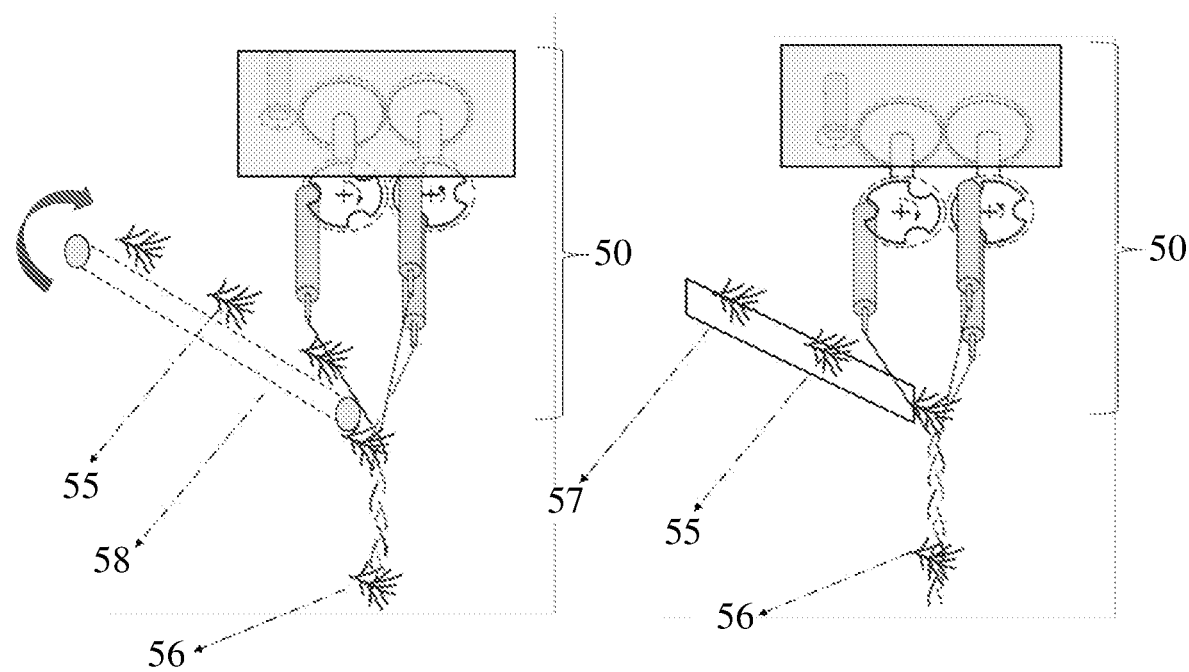
FIG. 14 illustrates apparatuses having a conveying device, in accordance with an implementation of the present subject matter.

FIG. 14 shows an apparatus having a two slot gear assembly with a three carrier intertwining assembly 50 which is inverted and placed vertically. The apparatus includes a conveying device or means which includes a chute 57 or a belt driven conveyor 58 configured to feed the seaweed propagules 55 into the intertwining zone 7 and adjacent to the braiding point 6. The chute 57 is configured such that each of the seaweed propagules 55, passing therethrough, fall adjacent to the braiding point 6 for embedding within the rope matrix 5 at the braiding point 6. The belt driven conveyor 58 is configured to move the seaweed propagules 55 such that each of the seaweed propagules 55 fall adjacent to the braiding point 6 into the intertwining zone 7 for embedding within the rope matrix 5 at the braiding point 6. As the seaweed propagule 55 falls from the chute 57 or the belt driven conveyor 58 into the intertwining zone 7, the seaweed propagule 55 is entangled into the intertwined rope matrix 56, which may subsequently be laid out in the sea. The seaweed propagule 55 coming into the chute 57 or the belt driven conveyor 58 may be fed manually or through a hopper, or through another conveying system. In an embodiment, the conveying device or means may also include a surface. The surface may be placed adjacent to the braiding point to provide a specific residence time to the seaweed propagule 55 prior to embedding within the rope matrix 5. The specific residence time is a minimum time that is required by the seaweed propagule 55 to intertwine within the rope matrix 5 being moved from the intertwining assembly 50. The surface may be flat, curved, have a mesh, have brushes, or have taut strands of rope to increase the residence time of the seaweed propagules 55 in the intertwining zone 7.

Figure 15A:
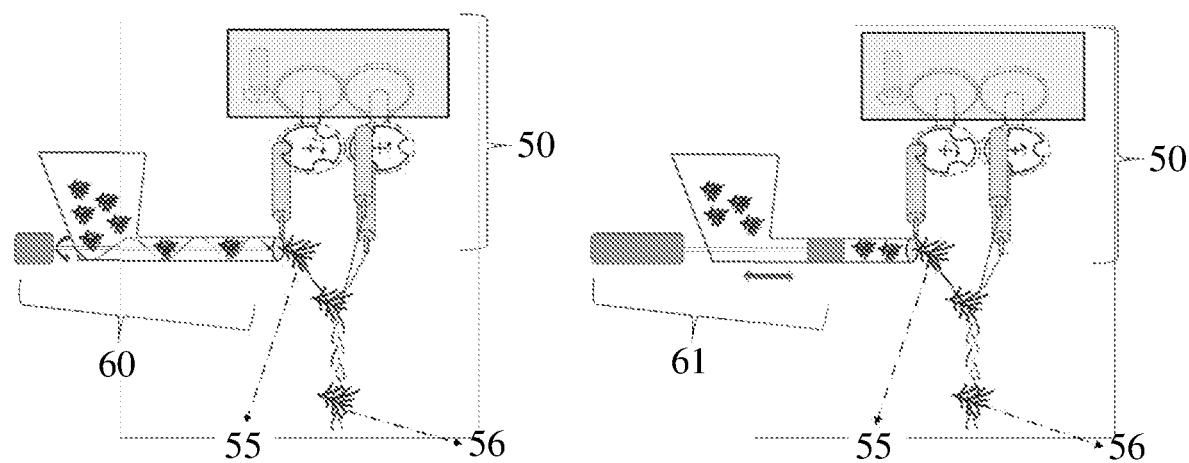
FIG. 15*a* illustrates an apparatus having a conveying device, in accordance with an implementation of the present subject matter.

FIG. 15a shows an apparatus having a two slot gear assembly with a three carrier intertwining assembly 50. The apparatus includes a conveying device or means which includes a screw feeder 60 or a piston feeder 61 configured to feed seaweed propagules 55 to the intertwining zone 7 and adjacent to the braiding point 6. The screw feeder 60 or the piston feeder 61 is confiugred to move the seaweed propagules 55 such that each of the seaweed propagules 55 fall adjacent to the braiding point 6 into the intertwining zone 7 for embedding within the rope matrix 5 at the braiding point 6. The seaweed propagule 55 entering the screw feeder 60 or the piston feeder 61 may be fed manually, through a hopper, or through another conveying system. In some embodiments, the conveying means may also include a surface. The surface may be placed adjacent to the braiding point to provide a specific residence time to the seaweed propagule 55 prior to embedding within the rope matrix 5. The specific residence time is a minimum time that is required by the seaweed propagule 55 to intertwine within the rope matrix 5 being moved from the intertwining assembly 50. The surface may be flat, curved, have a mesh, have brushes, or have taut strands of rope to increase the residence time of the seaweed propagules 55 in the intertwining zone 7.

Figure 15B:
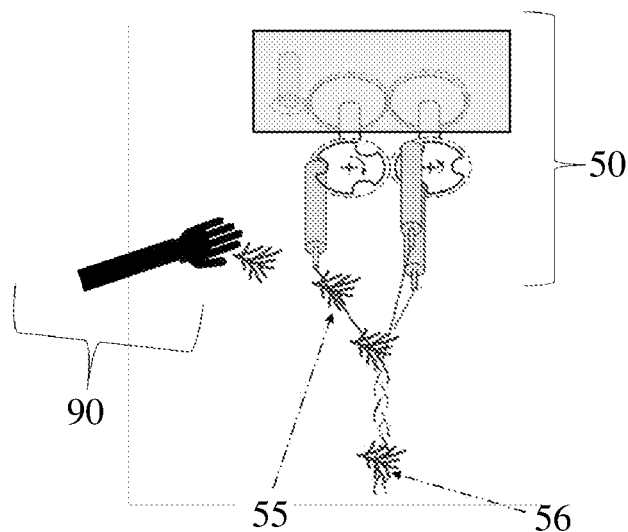
FIG. 15*b* illustrates an apparatus having a manual conveying assembly in accordance with an implementation of the present subject matter.

FIG. 15b shows an apparatus having a two slot gear assembly with a three carrier intertwining assembly 50. In embodiment such as the one shown in FIG. 15b, the seaweed propagules 55 are picked and placed manually by a person using their hands 90 in the intertwining zone 7 such that the seaweed propagules 55 may be embedded into the intertwined rope matrix 56.

Figure 16:
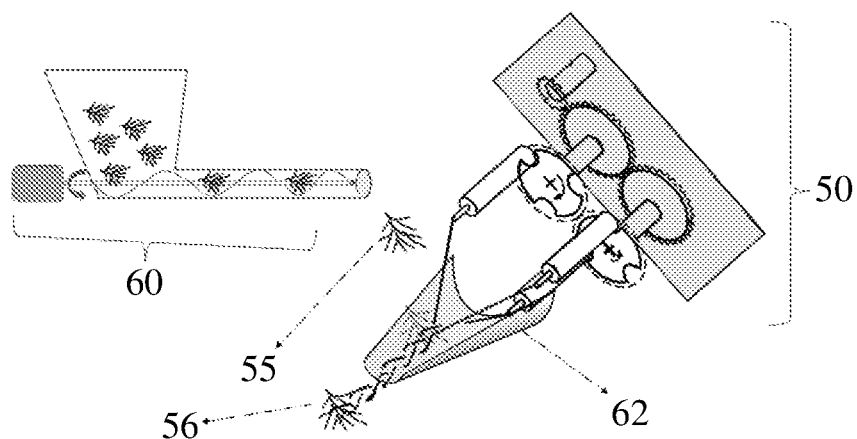
FIG. 16 illustrates an apparatus having a conveying device, in accordance with an implementation of the present subject matter.

FIG. 16 shows an apparatus having a two slot gear assembly with a three carrier intertwining assembly 50. The apparatus includes a conveying device or means which includes a screw feeder 60 and a plate guide 62 placed below the intertwining zone 7, such that the seaweed propagules 55 have a greater residence time in the intertwining zone 7 to entangle within the rope matrix 56. The apparatus of FIG. 16 shows a screw feeder 60; however, the apparatus may include any of the other seaweed feeding mechanisms described in the present disclosure. The plate guide 62 may be a flat plate, a half conical plate, or a curved plate configured to enable the seaweed propagule to embed within the rope matrix. The plate 62 may consist of a sheet, a mesh, a perforated sheet, or a combination thereof with suitable structural elements for strength and holding the plate 62 in position. In such embodiments, the seaweed propagules 55 falling from the screw feeder 60 are supported by the plate guide 62 such that the seaweed propagules 55 have greater time to embed efficiently within the intertwined rope matrix 56.

Figure 17:
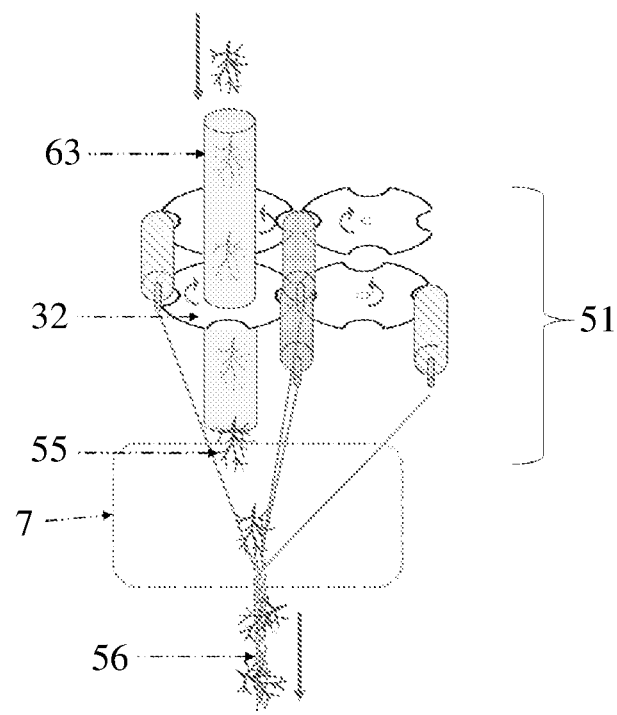
FIG. 17 illustrates an apparatus having a conveying device, in accordance with an implementation of the present subject matter.

FIG. 17 shows an apparatus having a four slot gear assembly with a four carrier intertwining assembly 51. The apparatus includes a conveying means which includes a pipe 63. When seaweed propagules 55 are passed through the pipe 63, the seaweed propagules 55 fall adjacent to the braiding point 6 for embedding within the rope matrix 56 at the braiding point 6. The pipe 63 passes through one of the slot gears 32. Further, the slot gear 32, through which the pipe 63 passes, is configured to rotate with the pipe 63 or the pipe 63 is configured to remain static. In some example embodiments, the pipe 63 may pass through the axis of one or more of the slot gears 32 for feeding seaweed propagules 55 into the intertwining zone 7. The pipe may be of any suitable shape, such as cylindrical, cuboidal, etc. The pipe 63 may also extend through the coaxial gears connected to the slot gear 32. The slot gears 32 are sufficiently large and an appropriate hollow axis is incorporated into one of the slot gears such that seaweed propagules 55 can pass through this opening into the intertwining zone 7. The seaweed propagules 55 may be passed through this pipe 63 either by gravity or using an active feeding method like a screw feeder or a piston. Once the seaweed propagule 55 enters the intertwining zone 7, the seaweed propagule 55 embeds within the intertwined rope matrix 56. The pipe 63 may include a screw feeder or a piston feeder configured to move the seaweed propagules 55 through the pipe 63. In some embodiments, the conveying device or means may also include a surface. The surface may be placed adjacent to the braiding point to provide a specific residence time to the seaweed propagule 55 prior to embedding within the rope matrix 5. The specific residence time is a minimum time that is required by the seaweed propagule 55 to intertwine within the rope matrix 5 being moved from the intertwining assembly 50. The surface may be flat, curved, have a mesh, have brushes, or have taut strands of rope to increase the residence time of the seaweed propagules 55 in the intertwining zone 7.

FIG. 17 shows an example apparatus with a four slot gear system. However, it should be understood that all the assemblies as described in the present disclosure are applicable to such a four slot gear system (i.e., all n slot gear assemblies, where n>1).

In the apparatuses described above, the intertwining assemblies 50 or 51 may be replaced with any other kind intertwining assemblies possessing n slot gears with n>1, with multiple configurations of carriers.

Figure 18:
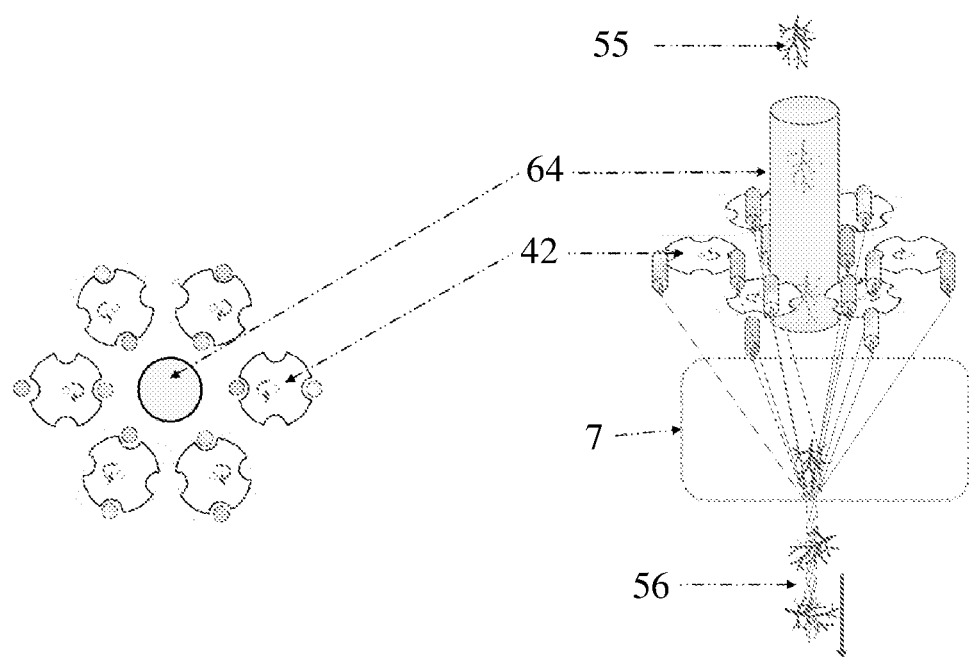
FIG. 18 illustrates an apparatus having a conveying device, in accordance with an implementation of the present subject matter.

FIG. 18 shows an apparatus having a six slot gear assembly with a twelve carrier intertwining assembly. The apparatus includes a conveying assembly which includes a pipe 64. When seaweed propagules 55 are passed through the pipe 64, the seaweed propagules 55 fall adjacent to the braiding point 6 for embedding within the rope matrix 56 at the braiding point 6. The pipe 64 passes through the slot gear assembly in a manner such that the slot gears 42 are positioned along the circumference of the pipe 64. In some example embodiments, the pipe 64 passes through the center of the arrangement of slot gears 42 for feeding seaweed propagules 55 into the intertwining zone 7. The pipe may be of any suitable shape, such as cylindrical, cuboidal, etc. The seaweed propagules 55 move into the intertwining zone 7 either by falling down the pipe 64 or through the action of an active conveying system, such as a screw conveyor or a piston. Once the seaweed propagule 55 enters the intertwining zone 7, the seaweed propagule 55 embeds within the intertwined rope matrix 56. The pipe 64 may include a screw feeder or a piston feeder configured to move the seaweed propagules 55 through the pipe 64. In some embodiments, the conveying device or means may also include a surface. The surface may be placed adjacent to the braiding point to provide a specific residence time to the seaweed propagule 55 prior to embedding within the rope matrix 5. The specific residence time is a minimum time that is required by the seaweed propagule 55 to intertwine within the rope matrix 5 being moved from the intertwining assembly 50. The surface can be flat, curved, have a mesh, have brushes, or have taut strands of rope to increase the residence time of the seaweed propagules 55 in the intertwining zone 7.

In both FIG. 17 and FIG. 18, the pipe 63, 64, respectively, may be replaced by a chute or any other hollow extruded shape. There may be a hopper or another conveying system above the pipe 63, 64 as well.

The intertwined rope matrix 56 with the embedded seaweed propagules may be laid out in the sea/tanks/ponds on a variety of structures such that the seaweed propagules are immersed in seawater for a substantial amount of time allowing the seaweed propagules to grow.

Harvesting the Substrate

The seaweed propagules attached to the rope matrix, when allowed to grow in seawater for an extended period time, grows to several times their size. Harvesting of these grown seaweeds from the rope matrix can be done through a variety of techniques. Generally, these techniques can be split into complete and partial harvesting. In complete harvesting, the entire plant is harvested and cleaned off the rope matrix. In partial harvesting, only the younger and recently grown portions of the plant are harvested. This can be done for a several reasons, for example:

1. By allowing the mature part of the plant to remain on the rope matrix, the rope matrix can be submerged in water again and allowed to regrow the portions of the plant which were cut off
2. When reseeding a new line, or the same line again, it is preferred to use cuttings of the plant which are relatively younger and fast growing. This is done by harvesting only that portion of the plant which is away from the central matrix-which mostly consists of plant tissue which has arisen in the current cycle—and these younger portions can grow faster when seeded in a new rope matrix.

In complete harvesting, the rope matrix may be passed through a small orifice or a slit, or a set of roller crushers to separate all bits of seaweed from the lines.

Figure 19:
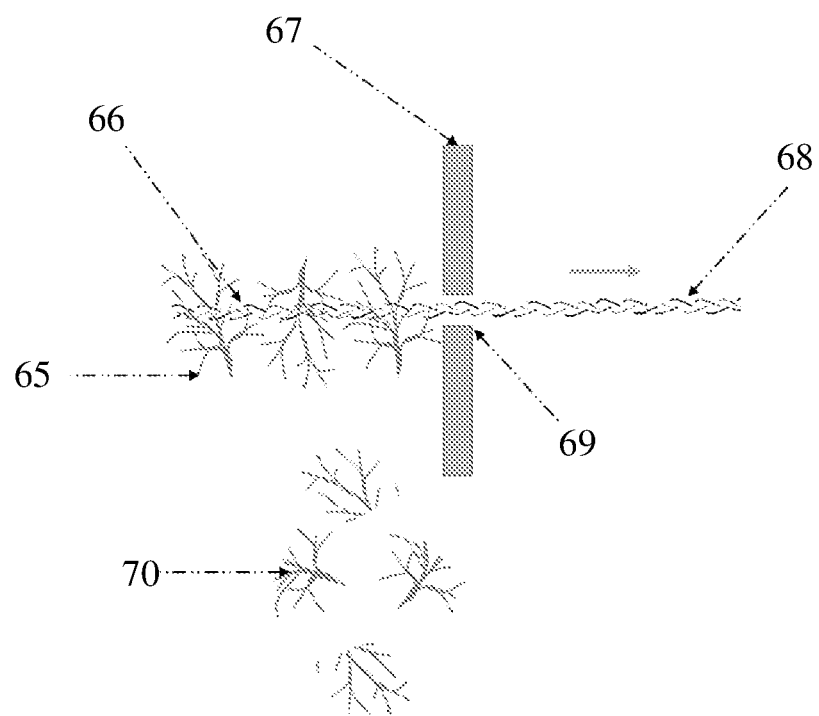
FIG. 19 illustrates a harvesting apparatus for a rope matrix formed by the apparatuses of the present subject matter.

FIG. 19 shows a sheet 67 with an orifice or slit or opening 69. The seaweed propagules embedded rope matrix, after being left in the water and completing their growing cycle and now having enlarged seaweed pieces 66 embedded in the intertwined rope matrix 66, is passed through the orifice or slit or opening 69 of the sheet 67. The rope is pulled through the orifice or slit or opening 69 and the seaweed plants 65, being much larger than the opening 69, break off the rope into smaller pieces 70. The empty intertwined rope matrix 68 is collected so that it may be reused.

In partial harvesting, a larger orifice, or a blade, or a scissor may be used, which may have a sharp or serrated edge. Additionally, the edge may configured to rotate to provide an improved slicing/sawing action. Apart from this the seaweed hanging on one or multiple sides of the ropes, the seaweed may be trimmed off using a device similar to a hedge trimmer, while allowing the older mature portion of the plant to remain attached. A linear reciprocating blade may be used to remove seaweeds similar to a hedge trimmer.

Aspects of the various embodiments described above can be combined to provide further embodiments. In general, in the following claims, the terms used should not be construed to limit the claims to the specific embodiments disclosed in the specification and the claims, but should be construed to include all possible embodiments along with the full scope of equivalents to which such claims are entitled.

We claim:

1. An apparatus for forming a rope matrix having seaweed propagules embedded therein, the apparatus comprising:
    an intertwining assembly configured to intertwine at least three ropes at a braiding point to form a rope matrix, the intertwining assembly comprising:
        three or more carriers, wherein at least three of the carriers carry a respective spool of rope, wherein, to form the rope matrix, the at least three of the carriers carrying the respective spools of rope, move about each other in a serpentine path such that the ropes pass alternatively over and under each other diagonally to a longitudinal axis of the rope matrix at the braiding point;
    a conveying device configured to introduce seaweed propagules adjacent to the braiding point enabling embedding of the seaweed propagules within the rope matrix while the rope matrix is being formed; and
    an offtake assembly configured to move the rope matrix, with the seaweed propagules embedded therein, out of the apparatus.

2. The apparatus of claim 1, wherein the conveying device comprises a conveyor belt configured to move the seaweed propagules such that each of the seaweed propagules fall adjacent to the braiding point for embedding within the rope matrix at the braiding point.

3. The apparatus of claim 1, wherein the conveying device comprises a chute configured to cause each of the seaweed propagules, passing therethrough, to fall adjacent to the braiding point for embedding within the rope matrix at the braiding point.

4. The apparatus of claim 1, wherein the conveying device comprises a screw feeder configured to move the seaweed propagules such that each of the seaweed propagules falls adjacent to the braiding point for embedding within the rope matrix at the braiding point.

5. The apparatus of claim 1, wherein the conveying device comprises a piston feeder configured to move the seaweed propagules such that each of the seaweed propagules falls adjacent to the braiding point for embedding within the rope matrix at the braiding point.

6. The apparatus of claim 1, wherein the intertwining assembly comprises:
   a slot gear assembly coupled to the carriers configured to move the carriers in the serpentine path, wherein the slot gear assembly comprises at least two slot gears.

7. The apparatus of claim 6, wherein the conveying device comprises a pipe through which the seaweed propagules are passed, wherein the seaweed propagules fall adjacent to the braiding point for embedding within the rope matrix at the braiding point when passed through the pipe, and wherein the pipe extends through one of the slot gears and is configured to corotate with the pipe.

8. The apparatus of claim 6, wherein the conveying device comprises a pipe through which the seaweed propagules are passed, wherein the seaweed propagules fall adjacent to the braiding point for embedding within the rope matrix at the braiding point when passed through the pipe, and wherein the pipe extends through the slot gear assembly such that the slot gears are positioned along the circumference of the pipe.

9. The apparatus of claim 7, wherein the pipe comprises one of a screw feeder and a piston feeder, the one of a screw feeder and a piston feeder configured to move the seaweed propagules through the pipe.

10. The apparatus of claim 2, wherein the conveying device comprises a support adjacent to the braiding point, wherein the support is configured to provide a specific residence time to the seaweed propagule prior to embedding within the rope matrix.

11. A method for forming a rope matrix having seaweed propagules embedded therein, the method comprising:
   intertwining, by an intertwining assembly of an apparatus, at least three ropes at a braiding point to form the rope matrix, wherein the intertwining assembly comprises three or more carriers, wherein at least three of the carriers carry a respective spool of rope, and wherein, the intertwining to form the rope comprises:
      moving the at least three of the carriers carrying the respective spool of rope about each other in a serpentine path such that the ropes pass alternatively over and under each other diagonally to a longitudinal axis of the rope matrix at the braiding point;
   introducing seaweed propagules adjacent to the braiding point such that the seaweed propagules are embedded within the rope matrix while the rope matrix is being formed; and
   moving, by an offtake assembly of the apparatus, the rope matrix, with the seaweed propagules embedded therein, out of the apparatus.

12. The method of claim 11, wherein introducing the seaweed propagules comprises:
   moving, by one of a conveyor belt of the apparatus, a screw feeder of the apparatus, and a piston feeder of the apparatus, the seaweed propagules towards the braiding point such that each of the seaweed propagules falls adjacent to the braiding point for embedding within the rope matrix at the braiding point.

13. The method of claim 11, wherein introducing the seaweed propagules comprises:
   directing, by one of a chute of the apparatus and a pipe of the apparatus, each of the seaweed propagules to fall adjacent to the braiding point for embedding within the rope matrix at the braiding point.

14. The method of claim 12, wherein introducing the seaweed propagules comprises:
   providing a specific residence time to the seaweed propagule prior to embedding within the rope matrix by a support of the apparatus adjacent the braiding point.

15. The method of claim 11, wherein the seaweed propagules are introduced manually.

16. The apparatus of claim 6, wherein the conveying device comprises a pipe through which the seaweed propagules are passed, wherein the seaweed propagules fall adjacent to the braiding point for embedding within the rope matrix at the braiding point when passed through the pipe, and wherein the pipe extends through one of the slot gears and is configured to static.

17. The apparatus of claim 8, wherein the pipe comprises one of a screw feeder and a piston feeder, the one of a screw feeder and a piston feeder configured to move the seaweed propagules through the pipe.

18. The apparatus of claim 3, wherein the conveying device comprises a support adjacent to the braiding point, wherein the support is configured to provide a specific residence time to the seaweed propagule prior to embedding within the rope matrix.

19. The apparatus of claim 4, wherein the conveying device comprises a support adjacent to the braiding point, wherein the support is configured to provide a specific residence time to the seaweed propagule prior to embedding within the rope matrix.

20. The apparatus of claim 5, wherein the conveying device comprises a support adjacent to the braiding point, wherein the support is configured to provide a specific residence time to the seaweed propagule prior to embedding within the rope matrix.

21. The apparatus of claim 7, wherein the conveying device comprises a support adjacent to the braiding point, wherein the support is configured to provide a specific residence time to the seaweed propagule prior to embedding within the rope matrix.

22. The apparatus of claim 8, wherein the conveying device comprises a support adjacent to the braiding point, wherein the support is configured to provide a specific residence time to the seaweed propagule prior to embedding within the rope matrix.

23. The method of claim 13, wherein introducing the seaweed propagules comprises:
   providing a specific residence time to the seaweed propagule prior to embedding within the rope matrix by a support of the apparatus adjacent the braiding point.

* * * * *